J. Lofvendahl,
Nutmeg Grater,

Nº 48,237. Patented June 13, 1865.

Witnesses:

Inventor:

UNITED STATES PATENT OFFICE.

JOSEPH LOFVENDAHL, OF BOSTON, MASSACHUSETTS, ASSIGNOR TO HIMSELF AND JOHN BLOMGVIST, OF SAME PLACE.

IMPROVED NUTMEG-GRATER.

Specification forming part of Letters Patent No. 48,237, dated June 13, 1865.

*To all whom it may concern:*

Be it known that I, JOSEPH LOFVENDAHL, of Boston, in the county of Suffolk and State of Massachusetts, have invented a new and Improved Grating Apparatus; and I do hereby declare that the following is a full, clear, and exact description thereof, which will enable others skilled in the art to make and use the same, reference being had to the accompanying drawings, forming part of this specification, in which—

Figure 1:
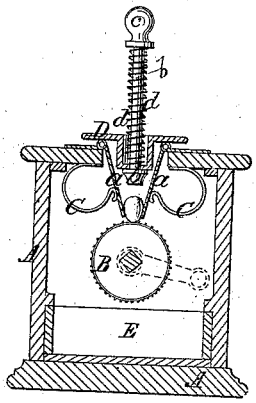
Figure 2:
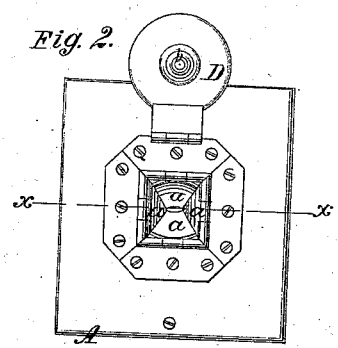
Figure 3:
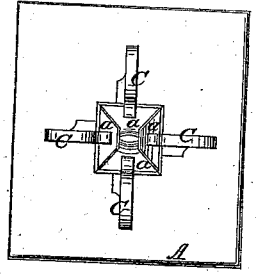

Figure 1 is a vertical central section of my invention, taken in the line $xx$, Fig. 2. Fig. 2 is a plan or top view of the same. Fig. 3 is a bottom view of the same.

Similar letters of reference indicate like parts.

This invention relates to a machine or apparatus intended especially for grating nutmegs, cocoanuts, and other hard substances.

My invention consists in arranging in a box, of any desirable form, a hopper for receiving the substance to be grated, having expanding sides for the purpose of permitting larger or smaller substances to be thrust through them to be subjected to the action of a revolving grater, and yet retain a hold upon such articles sufficient to prevent their displacement by the grater, said grater being arranged in the interior of the box; also, in the employment or use, in connection with such a hopper, of a plunger having spiral or other suitable spring arranged around its stem for throwing it upward after it has been depressed for the purpurpose of forcing the nutmeg or other substance upon the grater.

To enable others to understand my invention, I will proceed to describe it.

A designates the box, which may be made in any desirable form or shape.

B is the grater, which is mounted on a suitable shaft having its bearings in the box A, and extending through on one side for the purpose of attaching a crank (shown in dotted outline in Fig. 1) by which to revolve it. In the top of this box the hopper $a\ a$ is arranged, its sides consisting of strips or pieces of metal suitably hinged or secured at their top ends, made tapering toward their other ends, and extending down nearly to the surface of the grater.

C C are curved springs bearing against the sides of the hopper, one being provided for each side, as shown clearly in Fig. 3. The said springs C are attached to the under side of the top of the box, and they are made of sufficient strength to keep the sides of the hopper pressed tightly together, and to throw them back to this position after they have been expanded by forcing through them the nutmeg or other substance to be grated.

D is the cover or lid, which is hinged on top of the box, so as to cover the mouth of the hopper. A suitable hole is made in the said cover D, for the reception of a plunger, $b$, which has a suitable thumb-piece or knob, $c$, on its top, upon which to press when it is desired to thrust down or steady the nutmeg which is being subjected to the action of the grater. A spiral or other suitable spring, $d$, is coiled around or attached to this plunger for the purpose of throwing it up after it has been depressed.

E is a drawer arranged in the bottom of the box for receiving the grated substance.

I purpose in some cases constructing the box A with a perforated bottom covered by a suitable slide, by removing which slide the grated substance may be sifted into anything where it is intended to use it.

What I claim as new, and desire to secure by Letters Patent, is—

1. The hopper $a\ a$, in combination with the springs C or their equivalents, constructed substantially as herein shown and described.

2. The plunger $b$, in combination with the cover D and hopper $a\ a$, arranged substantially in the manner and for the purposes herein specified.

JOSEPH LOFVENDAHL.

Witnesses:
S. E. D. CURRIER,
GEO. MORRILL.